Feb. 20, 1962 N. L. COBB 3,021,765
VARIABLE FEED AND SPEED MECHANISM FOR
GEAR SHAPING MACHINES AND THE LIKE
Filed May 6, 1958 4 Sheets-Sheet 2

INVENTOR.
NEAL L. COBB
BY
John Morton
HIS ATTORNEY

INVENTOR.
NEAL L. COBB
HIS ATTORNEY

INVENTOR.
NEAL L. COBB
BY
HIS ATTORNEY

United States Patent Office 3,021,765
Patented Feb. 20, 1962

3,021,765
VARIABLE FEED AND SPEED MECHANISM FOR GEAR SHAPING MACHINES AND THE LIKE
Neal L. Cobb, Springfield, Vt., assignor to The Fellows Gear Shaper Company, Springfield, Vt., a corporation of Vermont
Filed May 6, 1958, Ser. No. 733,308
10 Claims. (Cl. 90—7)

The present invention relates to machines for forming gear teeth and other analogous forms on work blanks.

Such machines are of the well-known Fellows type which employ a reciprocating and rotating spindle having a cutter mounted on one end thereof. The cutter has teeth or analogous shapes circumferentially arranged about its peripheral edge. The cutter and cutter spindle are mounted adjacent to a work spindle which is geared to rotate in unison with the rotation of the cutter spindle during its reciprocation. A work blank is mounted on one end of the work spindle and both spindles are aligned so that the outside diameter of the cutter teeth overlap the periphery of the work blank.

The present invention may be carried out on mechanism such as is similarly shown and described in the patent of Edward H. Kendall, No. 2,749,805. This patent is concerned with the type of machine in which the present invention can be most suitably used. It is to be understood, however, that the protection claimed herein is not to be limited exclusively to combinations or uses with machines of that type.

An object of the present invention is to provide a device which provides alternate rates of rotary travel and reciprocation between a rotary cutting tool and a rotary work blank during a cutting operation.

Another object of the present invention is to provide a device in which many varied cutting ratios between a rotary cutting tool and a rotary work blank can be obtained to enable gears to be manufactured in a more rapid and efficient manner.

Another object of the present invention is to provide a device in which a selection of speed and feed ratios can be obtained to produce stroking and rotary feed travel between a cutting tool and work blank which will coincide with many various cutting conditions, an example of which is, a greater amount of stock can be removed from a work blank by the cutter and then a lesser amount of stock can be removed without changing the usual change gears.

Another object of the present invention is to provide a device in which a multiplicity of cutting speeds and a plurality of cutting feeds can be automatically effected to the cutting tool during a single cutting operation.

Another object of the present invention is to provide a device in which an increase or decrease in the number of cutter strokes per minute can be pre-selected to occur at any designated point and in which an increase or decrease in rotary travel of the cutter and work blank can be pre-selected to occur at any designated point during the cutting operation of any single gear.

In the drawings.

Like reference numerals designate the same parts wherever they occur.

Figure 1:
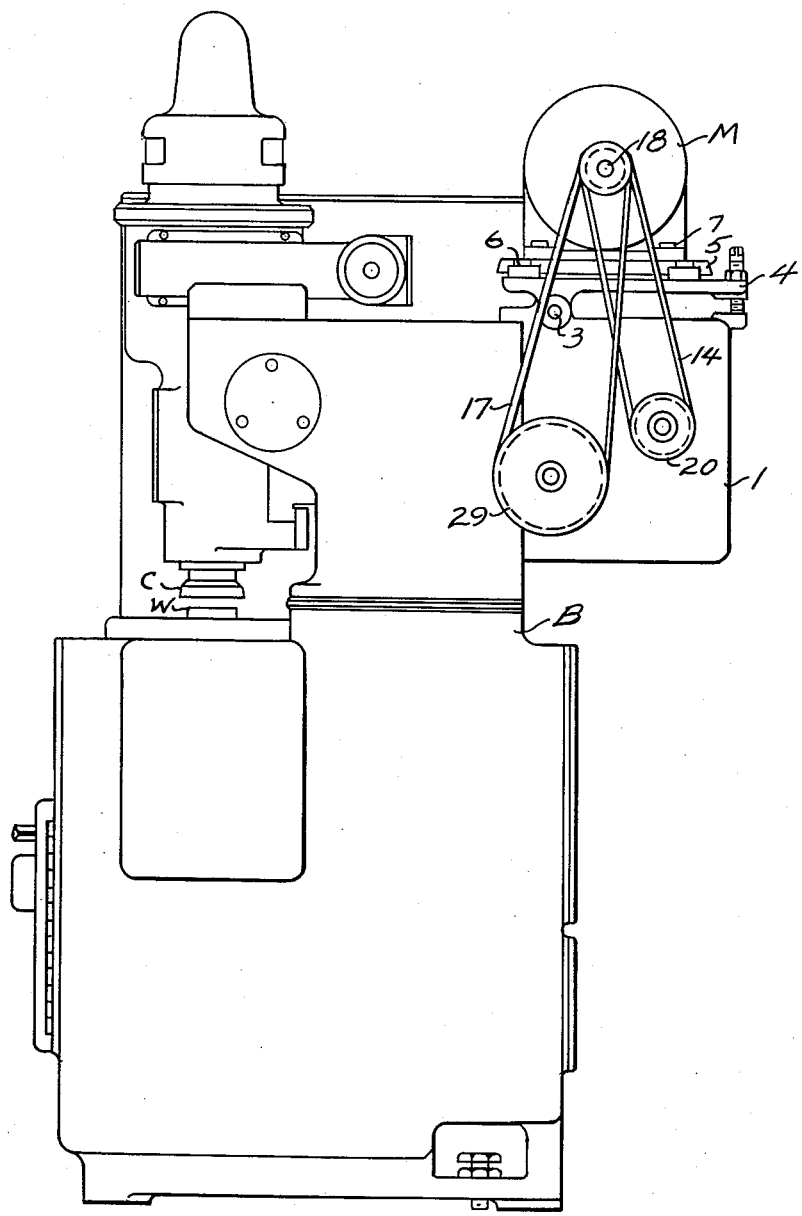
FIGURE 1 is a right hand side view of the type of machine shown in the Kendall patent with the present invention incorporated therein.
Figure 3:
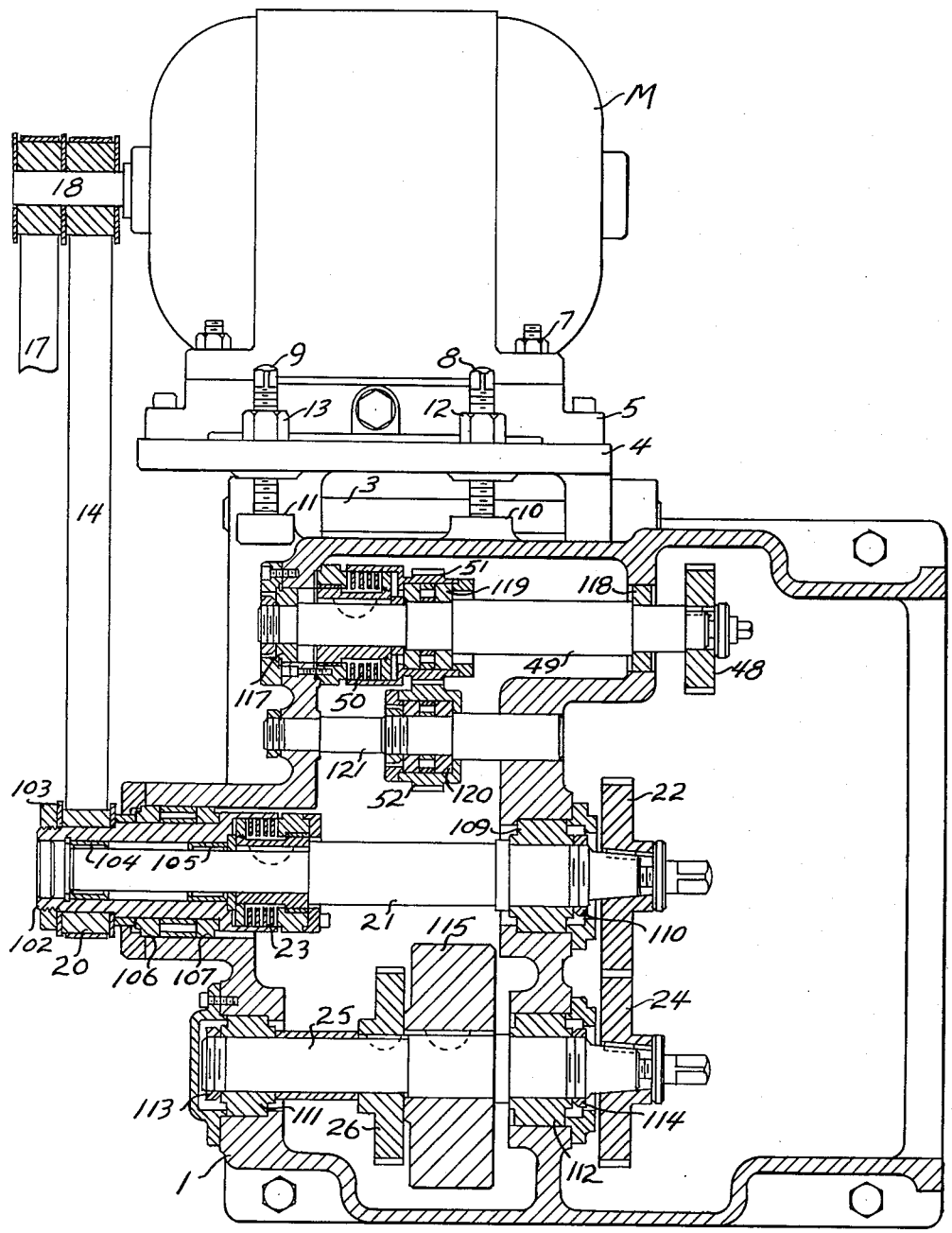
FIGURE 3 illustrates a detailed mechanical construction which may be employed to effect the desired result. This illustration shows a clutch type mechanism and is typical of similar mechanical devices which may be employed to carry out the present invention.

The structural embodiment of the present apparatus is encased in a frame member 1 (FIGURES 1 and 3). Frame 1 is held secure to the base B of the machine by any suitable means.

The top of frame 1 has a pivotal mounting which contains a pivot pin 3 (FIGURES 1 and 3) on which is mounted a support member 4. A motor mount 5 is slideably mounted on support member 4 and can be adjustably positioned and held secure to support member 4 by bolts 6.

A motor M which replaces motor M of the Kendall patent drives the present apparatus and the machine on which it is attached thereto, motor M being held secure to motor mount 5 by bolts 7.

Support member 4 has threaded screws 8 and 9 which thread through complementally threaded portions in support member 4 and abut against flats 10 and 11 on frame 1.

Figure 2:
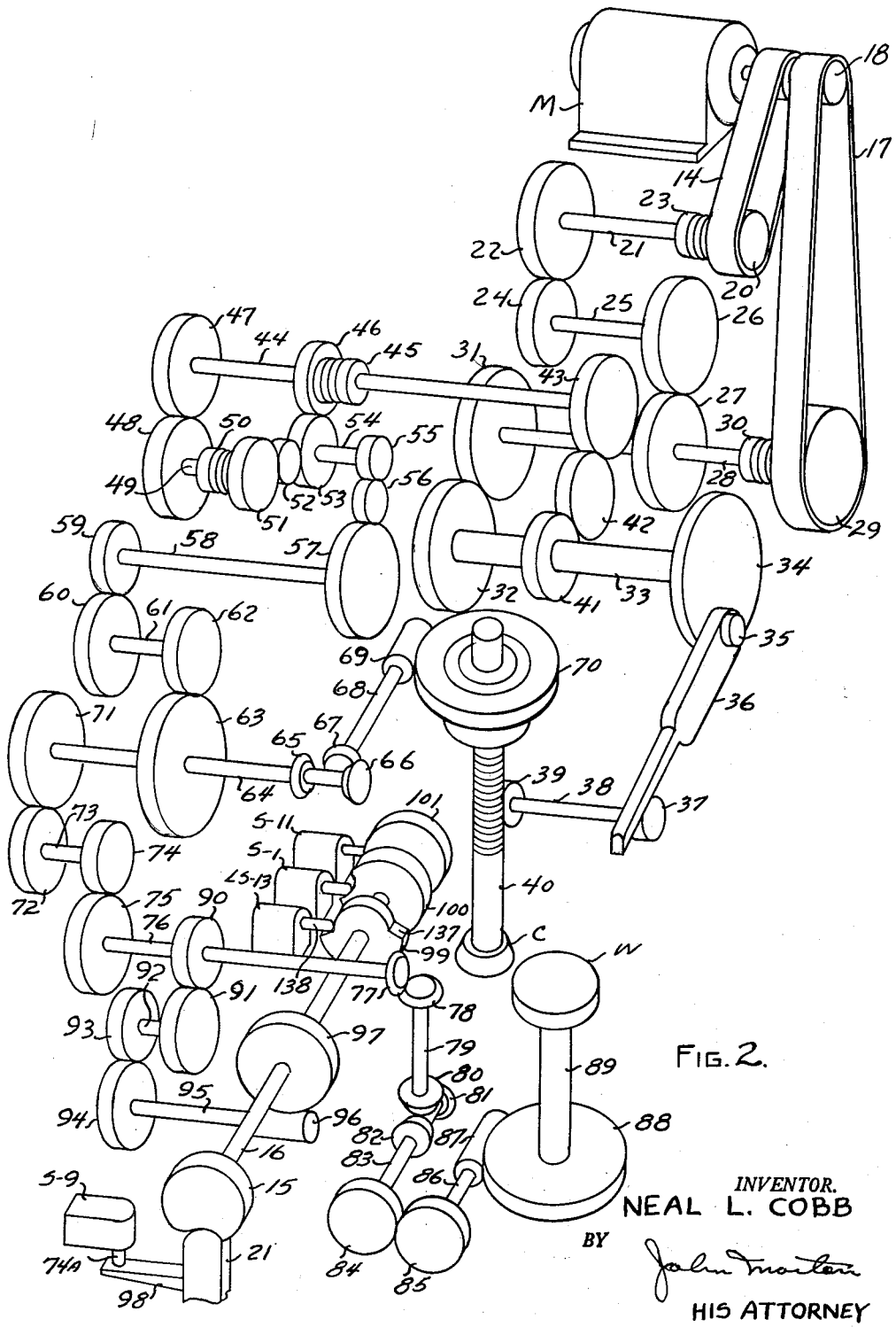
FIGURE 2 is a mechanical schematic view of the present invention and illustrating a means which may be employed in stroking the cutter spindle and rotating the same in timed relation to the work spindle rotation in a machine of the class described.

Screws 8 and 9 each have a nut 12 and 13 threaded thereon. Each nut tightens against the top surface of support member 4 after screws 8 and 9 have been adjusted to effect the desired tension on belts 14 and 17. As shown in FIGURES 1 and 2 these belts are both rotated by motor spindle 18.

As seen in FIGURE 2 belt 14 rotates pulley 20 and shaft 21 and gear 22. Shaft 21 has mounted thereon a clutch member 23 which is a high speed stroking clutch. Gear 22 meshes with gear 24 which is mounted on shaft 25 which has on its other end a gear 26 rotating in mesh with a like gear 27 which is mounted on a shaft 28.

Shaft 28 has on one end thereof a pulley 29 which is rotated by belt 17. In front of pulley 29 on shaft 28 is mounted a clutch member 30 which is the low speed stroking clutch, the function of which will be later described.

On the other end of shaft 28 is mounted a gear 31 which rotates in mesh with a conjugate gear 32 which is mounted on a shaft 33.

On the other end of shaft 33 is mounted a crank wheel 34 on which is mounted a crank pin 35. Pivoted on crank pin 35 is a crank arm 36. One end of crank arm 36 contains a segment of rack teeth (not shown) which mesh with pinion gear 37 which is mounted on a shaft 38.

The other end of shaft 38 has mounted thereon a pinion 39 which meshes with rack teeth on the cutter spindle 40. It will be obvious that as is customary in the usual gear shaper operation the rotation of crank wheel 34 and arm 36 will effect the necessary stroking to cutter spindle 40 and cutter C through the rotation of gears 37, 39 and shaft 38.

Shaft 33 which has crank wheel 34 mounted on one end and gear 32 on the other end contains a third gear 41 between crank wheel 34 and gear 32. Gear 41 rotates with shaft 33 and rotates in mesh with an idler gear 42.

Idler gear 42 rotates in mesh with gear 43 which is mounted on one end of a shaft 44 which has on its other end a gear 47.

Mounted on shaft 44 is a gear 46 and a clutch member 45 which is a high speed rotary feed clutch.

Gear 47 rotates in mesh with gear 48 which is mounted on one end of shaft 49. Gear 51 is mounted on the other end of shaft 49. Also mounted on shaft 49 is a clutch member 50 which is the low speed rotary feed clutch.

The purpose of these clutches will be described later in the description of the correlation between the mechanical and electrical sequences.

Gear 51 rotates in mesh with an idler gear 52. Idler gear 52 rotates in mesh with a gear 53 which is fixed to shaft 54 and which rotates in mesh with a conjugate gear 46 mounted on shaft 44.

On shaft 54 is mounted a pinion gear 55. Gear 55 drives an idler gear 56. Gear 56 drives gear 57 which is mounted on the end of shaft 58. Shaft 58 has fixed thereto a gear 59 which rotates in mesh with a gear 60.

Gear 60 is fixed to a shaft 61 which has a second gear 62 mounted on its opposite end. Gear 62 rotates gear 63 which is secured to and rotates shaft 64. Shaft 64 contains on one end a pair of bevel gears 65 and 66. Either of these bevel gears may rotate a like bevel gear 67 which turns shaft 68 and worm 69. Worm 69 rotates worm wheel 70 which effects the necessary rotation to cutter spindle 40 and cutter C.

On the other end of shaft 64 a gear 71 is mounted. Gear 71 rotates a gear 72. Gear 72 is fixed to shaft 73 which has a gear 74 mounted on its other end. Gear 74 rotates gear 75 and thereby shaft 76. Shaft 76 has mounted on its other end a bevel gear 77 which meshes with a like bevel gear 78 which is mounted on a shaft 79 having a similar bevel gear 80 mounted on its other end.

Bevel gear 80 meshes with one of either like bevel gears 81 and 82 which are mounted on shaft 83. Shaft 83 rotates gear 84 which rotates in mesh with a like gear 85 fixed to shaft 86.

Also fixed to shaft 86 is worm 87. Worm 87 turns lower worm wheel 88 and work spindle 89 to effect the necessary rotation of work blank W.

Shaft 76 has another gear 90 mounted on it. Gear 90 rotates in mesh with a gear 91. Gear 91 is fixed on shaft 92 as is gear 93. Gear 93 rotates gear 94. Gear 94 rotates shaft 95 and worm gear 96. Worm gear 96 rotates worm wheel 97. Worm wheel 97 rotates shaft 16 which rotates depth feed cam 15, which corresponds to feed cam 15 of the Kendall patent.

As depth feed cam 15 rotates a slide member 21 raises and lowers (by a means not shown) according to the peripherial contour of cam 15 to bring an arm 98 in and out of contact with limit switch S9 through push rod 74a which is similar to push rod 74 shown in FIGURE 1 of the above mentioned patent.

On the other end of shaft 16 are mounted three cams 99, 100, and 101. Each of these cams rotate with shaft 16 and depth feed cam 15 to actuate their respective limit switches LS13, S1 and S11.

Shaft 16, depth feed cam 15, slide member 21 and its limit switch S9, limit switch S1 and limit switch S11 all correspond to like parts shown in the Kendall Patent 2,749,805.

As is well-known in the art the depth feed cam is rotated in proper timed relation with the rotation of the work spindle and the rotation and reciprocation of the cutter spindle.

Shown in FIGURE 3 is a typical mechanical construction which may be employed to obtain the desired results. Belt 14 drives pulley 20 which is mounted on sleeve 102. Pulley 20 is held secure thereon by a nut 103. Sleeve 102 is rotatably mounted about shaft 21 on two bearing members 104 and 105. Sleeve 102 is rotatably journaled in frame 1 within two bearings 106 and 107.

Clutch 23 is a standard well-known type of electric magnetic clutch frequently called an electro-magnetically actuated friction coupling. When clutch 23 is electrically energized it positively joins sleeve 102 to shaft 21 to drive the same and when clutch 23 is deenergized sleeve 102 rotates freely about shaft 21.

The other end of shaft 21 is rotatably mounted in frame member 1 in a bearing 109. Bearing 109 is held securely in place by nut 110. Gear 22 meshes with gear 24 and therefore rotates shaft 25. Shaft 25 is rotatably journaled in frame member 1 in bearings 111 and 112. Bearing 111 is held in place by nut 113 and bearing 112 is held secure by nut 114. A fly wheel 115 may be mounted on shaft 25 to keep the rotational speed of shaft 25 relatively constant when any chattering occurs between cutter and work.

Also seen in FIGURE 3 is clutch member 50 which is mounted on shaft 49. Clutch 50 is also an electrically operated magnetic type clutch and when energized shaft 49 rotates with clutch 50. Shaft 49 is journaled in frame member 1 at each end of bearings 117 and 118.

A gear 51 is fixed to rotate with clutch 50 and is likewise rotatably mounted on shaft 49 on a bearing member 119. Gear 51 rotates in mesh with idler gear 52 which is rotatably mounted on bearing 120 on stub shaft 121.

Clutches 30 and 45 are mounted in the same manner as clutches 23 and 50 which are shown in FIGURE 3. Clutches 30 and 45 are both electrically operated magnetic clutches and when energized they lock the sleeve or shaft on which they are mounted to rotate therewith.

Under normal cutting conditions it is customarily desirable to change the rotary feeding ratio of the cutter from fast to slow or from slow to fast to obtain the best cutting conditions.

Likewise it is desirable when making these changes to also change the ratio of stroking to the cutter spindle from fast to slow or from slow to fast during the cutting cycle of a single gear. In the past it has been customary and well-known in the art to utilize change gears to alter these ratios. This results in shutting down the machine while change gears are being removed and installed which effects a loss of cutting time.

Also in cutting different workpieces often times a multiplicity of cuts are desirable. A cut may be defined as one complete rotation of both the cutter and workpiece during a cutting cycle.

If, for example, a particular gear is being shaped where a lesser degree of accuracy is necessary and a saving of cutting time is desirable, then selector switches can be set before the cutting is started to effect a low speed stroking to the cutter spindle and a low speed rotary travel to the cutter relative to the workpiece for the first cut and without shutting down the machine the second cut will start with an increased high speed stroking ratio to the cutter and cutter spindle and an increased high speed rotary feed to the cutter and workpiece. This high speed rate of stroking and high speed rotary feed will continue during the next cut until the cutter has reached its prescribed depth, then it will back away from the cutting zone. The function and operation of the selector switches will be described later in the specification.

The present application specifically describes the alternate selections between ratios of feed and speed and relates to gears being shaped in two cut cycles but the present invention need not be limited to such two cut cycles. Other cycles other than two cut cycles may be utilized since a multiplicity of cuts with a greater multiplicity of speed and feed choices may be obtained by increasing the number of controls.

If it should be desirable or necessary to cut a gear by running the first cut with a low speed stroking and a high speed rotary travel of the cutter relative to the workpiece for the first cut and at the end of the first cut have the stroking speed change to a high speed with a continued high speed rate of rotary travel to the cutter relative to the workpiece during the second cut, this can be attained by choice of the selector switches. The change from low speed stroking to high speed stroking may occur at the end of the first cut and just prior to the beginning of the second cut without having to shut the machine off.

A low speed stroking for the first cut and a high speed stroking for the second cut can also be obtained along with a low speed rotary travel to the cutter relative to the workpiece during both first and second cuts.

A low speed rotary travel to the cutter relative to the work blank for the first cut can be attained along with a high speed stroking to the cutter during the first cut and then have the rotary travel of the cutter change to a high speed for the second cut with a continued high speed stroking for the second cut.

If desired a low speed rotary travel of the cutter relative to the work, with a low speed stroking of the cutter for the first cut can be obtained, and then as a second step the rotary travel of the cutter may change to a high speed rate of travel for the second cut with a continued low speed stroking of the cutter.

Another alternate that can be effected on a machine of the class described is: a high speed stroking for both the first and second cut which can be run with a high speed rotary feed to the cutter for both first and second cuts as will be apparent to anyone skilled in the art.

A high speed stroking for both cuts along with a low speed rotary feed for both cuts can also be attained. Or a low speed stroking for both cuts with a high speed rotary travel for both cuts.

A low speed stroking for both first and second cuts can also be run with a low speed rotary feed to the cutter for both the first and second cuts.

The above combinations of feed and speed can be alternately used depending of course on cutting conditions such as desired shape being formed, or degree of hardness, or thickness of cutter or work blank, or amount of accuracy necessary. In any case a speed up of cutting time results from not having to stop the machine in the middle of a cutting cycle to change change gears and having both machine and operator occupied in non-productive time.

Figure 4:
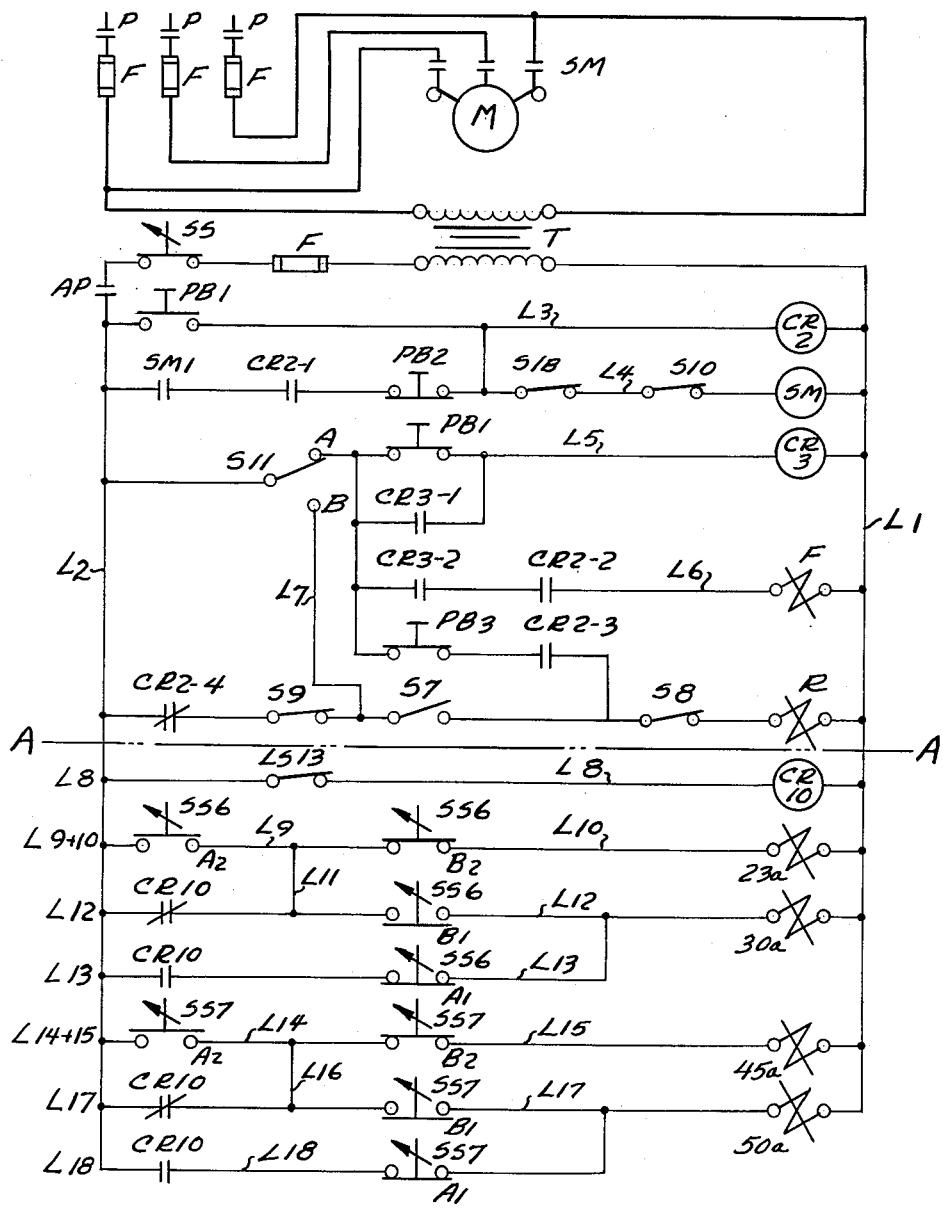
FIGURE 4 is an electrical schematic view of the present invention which has incorporated in it a wiring diagram similar to the one in Patent No. 2,749,805.

The electric controls used to properly time the movement of the various elements are shown in FIGURE 4. In part this electric diagram is the same up to line AA of FIGURE 4 as disclosed in the E. H. Kendall Patent 2,749,805. The electrics of the present apparatus begin where the electrics in the above mentioned patent end, namely with line L8 which contains limit switch LS13 and coil of relay CR10. At the outset of operation of the present electrical apparatus it must be kept in mind that the saddle and cutter spindle on a machine of the class described are moved to the right and that the cutter C is in conjugate cutting range relative to the work W. Line L8 receives its source of power from the same lines L1 and L2 which feed the electrical power to the mechanism in the Kendall patent.

In FIGURE 4 the selector switch SS6–B2 on line L10 and selector switch SS6–A1 on line L13 are shown closed and selector switch SS6–A2 on line L9 and selector switch SS6–B1 on line L12 are shown in an open position.

Also selector switch SS7–B2 on line L15 and selector switch SS7–A1 on line L18 are shown in a closed position and selector switch SS7–A2 on line L14 and selector switch SS7–B1 on line L17 are shown in an open position.

Limit switch LS13 on line L8 is shown in a closed position thus completing the circuit on line L8 to energize the coil of relay CR10. When the coil of relay CR10 becomes energized its contactors CR10 on line L12 and line L17 which are shown in FIGURE 4 as normally closed will open. Also when the coil of relay CR10 becomes energized the contactors CR10 on line L13 and line L18 that are shown in a normally open position will close.

When this occurs the source of power is conveyed from line L2 through line L13 to line L12 to energize solenoid 30a which actuates the low speed stroking clutch 30. Also the source of power is conveyed from line L2 through line L18 to line L17 to energize solenoid 50a which actuates low speed feed clutch 50.

Referring to FIGURE 2, when low speed stroking clutch 30 becomes energized (keeping in mind that high speed stroking clutch 23 is deenergized) the source of rotation from motor M is being conveyed by belt 17 to pulley 29, and as a result of clutch 30 becoming energized shaft 28 rotates with clutch 30, and pulley 29. Gear 27 (FIGURE 2) is also rotated with shaft 28 and it rotates gear 26, shaft 25, gear 24, gear 22 and shaft 21 but that is as far as the rotation goes since clutch 23 is deenergized shaft 21 will rotate in clutch 23.

With low speed stroking clutch 30 energized it rotates shaft 28 which rotates gear 31 which in turn rotates gear 32 and shaft 33 which rotates crank wheel 34 and crank 36 to effect a slow rate of reciprocation to cutter spindle 40 and cutter C.

Gear 41 mounted on shaft 33 rotates therewith and in turn rotates idler gear 42 to turn gear 43 and shaft 44. High speed feed clutch 45 on shaft 44 is deenergized so shaft 44 rotates freely in clutch 45 and rotates gear 47 which rotates gear 48 and shaft 49. Low speed feed clutch 50 is energized, therefore low speed feed clutch 50 and its integral gear 51 rotate with the rotation of shaft 49.

Gear 51 rotates idler gear 52 and gear 53.

It will be noted at this point that due to the greater diameter of gears 47 and 48 (FIGURE 2) in comparison to the diameter of gears 46 and 53 that by employing low speed feed clutch 50 and deenergizing high speed feed clutch 45 that the rotation of shaft 49 and all gearing and shafts rotated thereafter will be greatly reduced in rotational speed.

Gear 53 rotates shaft 54, gear 55, idler gear 56, gear 57, shaft 58 and gear 59. Gear 59 rotates gear 60 and rotation continues on through the gear train until worm 69 rotates upper worm wheel 70 to give the necessary low speed rotary travel to cutter spindle 40 and cutter C. Gear 72 (FIGURE 2) is rotated by gear 71 of the rotary cutter drive and as a result rotates shaft 73, gear 74, gear 75, shaft 76 and on down through the train of bevel gearing to rotate lower worm wheel 88 to give the necessary low speed rotary travel to work spindle 89 and work W.

For illustrative purposes cam 99 (FIGURE 2) may be a two lobe cam and is shown in position whereby limit switch LS13 is energized or closed. As the gearing in the machine rotates and the cutter C performs its first cut on work blank W the depth feed cam 15, shaft 16 and cam 99 rotates in unison. Cam 99 rotates until flat 137 comes in contact with stem 138 of LS13 thereby depressing stem 138 to deenergize limit switch LS13. This happens at the end of the first cut on work W and just prior to the starting of the second cut.

When limit switch LS13 on line L8 deenergizes its opens to break the circuit on line L8, this deenergizes the coil of relay CR10. When the coil of relay CR10 becomes deenergized its contactors CR10 on lines L12 and L17 close and its contactors CR10 on lines L13 and L18 open to the same position as shown in FIGURE 4.

When this occurs, contactor CR10 on line L13 breaks the circuit through line L13 to line L12 and solenoid 30a becomes deenergized then the low speed stroking clutch 30 becomes deenergized. The contactor CR10 on the line L18 then breaks the circuit on line L18 through line L17 to deenergize solenoid 50a which deenergizes low speed feed clutch 50.

At the time this occurs the contactors CR10 on lines L12 and L17 close. CR10 on line L12 completes the circuit on line L12 up to selector switch SS6–B1 which is open. Since power cannot go by this selector switch it shunts up line L11 to line L10 and past selector switch SS6–B2 which is closed and over to energize solenoid 23a which actuates high speed stroking clutch 23.

The closing of contactor CR10 on line L17 conveys the power from line L2 through part of line L17 up through line L16 to line L15 to energize solenoid 45a which actuates high speed feed clutch 45.

With the start of the second cut the deenergizing of the low speed stroking clutch 30 and low speed feed clutch 50 and the energizing of the high speed stroking clutch 23 and the high speed feed clutch 45 rotation is supplied to the machine by belt 14 (FIGURES 1 and 2).

Low speed stroking clutch 30 is deenergized, therefore it rotates about shaft 28.

High speed stroking clutch 23 is energized therefore shaft 21 rotates with clutch 23 and likewise gear 22 rotates. Gear 22 rotates gear 24, shaft 25 and gear 26. Gear 26 rotates gear 27 and shaft 28. At this point it will be noted that shaft 28 will be rotated at a much faster rate of rotation if driven in this manner by gears 27 and 26 than if driven by pulley 29, since the ratio of rotation between motor M and pulley 20 is one to one and an additional speed up action is given to this manner of drive due to the size of the diameters of gears 22 and 24.

Gear 31 turns with shaft 28 and rotates gear 32 which in turn rotates shaft 33 and crank wheel 34 and crank arm 36 to effect the fast stroking to cutter spindle 40 and cutter C for the second cut.

As shaft 33 rotates gear 41 rotates therewith. Gear 41 rotates idler gear 42 which turns gear 43 and shaft 44. On the end of shaft 44 gear 47 rotates in mesh with gear 48. Gear 48 turns shaft 49. Clutch 50 is deenergized therefore it is not locked to shaft 49, therefore clutch 50 and gear 51 do not rotate.

Clutch 45 is energized therefore clutch 45 and gear 46 rotate with shaft 44. Shaft 44 is rotating rapidly and it gets this rapid rotation from shafts 28 and 33, and of course the gearing therebetween as shown in FIGURE 2.

Gear 46 rotates gear 53, shaft 54, gear 55, idler gear 56, gear 57, shaft 58, gear 59 and on down through the train of gearing to rotate the cutter spindle at a relatively fast rate of rotation to coincide with the fast rate of reciprocation of the cutter spindle during the second cut. After the second cut is complete and the gear blank is finished the cutter C backs away from the work as is customary in the manner well-known in the art.

If it should be desirable to run the machine with a relatively low speed stroking of the cutter relative to the work and a high speed rate of rotation of the cutter C relative to the work W during the first cut and then have the stroking change to a high speed and the relative rotary travel of the cutter and work continue at a high rotary speed during the second cut then selector switch SS7–A2 on line L14 will have to be closed and selector switch SS7–A1 on line L18 will have to be opened. The first phase of the cutting cycle, cut number one, will start with limit switch LS13 on line L8 closed. Coil of relay CR10 becomes energized. Contactors CR10 on lines L12 and L17 open and contactors CR10 on lines L13 and L18 close. Power is shunted from line L2 through to line L1 by means of line L13, and line L12 to energize solenoid 30a which actuates low speed stroking clutch 30 for the first cut.

At the same time power is shunted from line L2 to line L1 through the closed selector switch SS7–A2 on line L14 through the closed selector switch SS7–B2 on line L15 to energize solenoid 45a which actuates the high speed feed clutch 45 for the first cut. At the end of the first cut and just prior to the second cut cam 99 functions as described above, its flat 137 depressing stem 138 of limit switch LS13. LS13 on line L8 opens to break the circuit between lines L2 and L1. This deenergizes the coil of relay CR10 on line L8. When the coil of relay CR10 becomes deenergized the contactors CR10 on line L12 and L17 close and the contactors CR10 on lines L13 and L18 open.

Contactor CR10 on line L13 breaks the circuit in lines L13 and L12 to deenergize solenoid 30a which deenergizes low speed stroking clutch 30. Now the power between lines L2 and L1 travels through line L12 up line L11 through line L10 to energize solenoid 23a which actuates high speed stroking clutch 23.

And at the same time power travels through line L14 and L15 to keep solenoid 45a energized which in turn keeps high speed feed clutch 45 energized during the second cut. In this choice of speed and feed whereby the low speed stroking clutch 30 and the high speed feed clutch 45 are energized for the first cut and the high speed stroking clutch 23 and the high speed feed clutch 45 are energized for the second cut the gearing controlled as a result of each change is rotated in the same manner as previously described. All changes hereafter relating to the clutches becoming alternately energized or deenergized will result in the same relative rotation of the gears and shafts as has been previously described, therefore it is felt unnecessary to describe at length the chain of gear rotation that results from any particular clutch becoming energized or deenergized.

If it should be desirable to run the machine with a low speed stroking of the cutter for the first cut along with a low speed rotary feed to the cutter and work for the first cut and then change the stroking to high speed for the second cut along with a continued low speed rotary feed for the second cut then selector switches should all remain the same as shown in FIGURE 4 with the exception of SS7–B2 on line L15 should be opened and SS7–B1 on line L17 should be closed.

When the first cut begins coil of relay CR10 becomes energized, contactors CR10 on lines L12 and L17 open and contactors CR10 on lines L13 and L18 close. Power is then carried from line L2 to line L1 by line L13 to line L12 to energize solenoid 30a which actuates low speed stroking clutch 30 and power is also conveyed from line L2 to line L1 by line L18 to line L17 to energize solenoid 50a which actuates low speed feed clutch 50.

When the second cut begins cam 99 performs the same function as previously described and limit switch LS13 on line L8 opens to deenergize coil of relay CR10. Contactors CR10 on lines L12 and L17 open and contactors CR10 on lines L13 and L18 close, contactor CR10 on line L13 breaks the circuit on lines L13 and L12 to deenergize solenoid 30a which deenergizes low speed stroking clutch 30. Power then goes from line L2 to line L1 by line L12 through line L11 to line L10 to energize solenoid 23a which actuates high speed stroking clutch 23, also power goes from line L2 to line L1 by line L17 to keep solenoid 50a energized which in turn keeps low speed feed clutch 50 energized for the second cut.

If for example it should be desirable to run the first cut at a low speed rotary feed for the cutter relative to the work blank along with a high speed rate of stroking and then have the second cut run with a high speed rate of rotary travel for the cutter relative to the work blank and have a continued high speed rate of stroking for the second cut then all the selector switches remain the same as shown in FIGURE 4 with the exception of selector switch SS6–A1 on line L13 should be opened and SS6–A2 on line L9 should be closed.

When the first cut begins the coil of relay CR10 becomes energized and its contactors CR10 on lines L12 and L17 open, also its contactors CR10 on lines L13 and L18 close. The power travels through line L9 to line L10 to energize solenoid 23a which actuates the high speed stroking clutch 23 and at the same time power travels through line L18 to line L17 to energize solenoid 50a which actuates the low speed feed clutch 50.

At the end of the first cut limit switch LS13 on line L8 opens and coil of relay CR10 deenergizes and its contactors CR10 on lines L12 and L17 close and also its contactors CR10 on lines L13 and L18 open.

Contactor CR10 on line L18 breaks the circuit on lines L18 and L17 to deenergize solenoid 50a which deenergizes low speed feed clutch 50 then power goes through line L17 and up line L16 and through line L15 to energize solenoid 45a which actuates high speed feed clutch 45 for the second cut.

At the same time power continues through line L9 to line L10 to keep solenoid 23a energized which in turn keeps high speed stroking clutch 23 energized for the second cut.

If it should be desired to run the machine with the first cut at a low rate of rotary feed of the cutter relative to the work blank along with a low rate of reciprocatory stroking of the cutter and have the second cut run with a high rate of rotary travel of the cutter relative to the work along with a continued low rate of stroking then the selector switches should remain the same as shown in FIGURE 4 with the exception of SS6–B1 on line L12 should be closed and SS6–B2 on line L10 should be opened.

When the first cut starts coil of relay CR10 on line L8 becomes energized because LS13 closes and its contactors CR10 on lines L12 and L17 open and also its contactors CR10 on lines L13 and L18 close. The power then goes through line L18 to line L17 to energize solenoid 50a which actuates low speed feed clutch 50 for the first cut and also the power goes through line L13 and through line L12 to energize solenoid 30a which actuates low speed stroking clutch 30 for the first cut.

When the second cut begins LS13 on line L8 opens, coil of relay CR10 deenergizes and its contactors CR10 on lines L12 and L17 close and its contactors CR10 on lines L13 and L18 open. Contactor CR10 on line L18 breaks the circuit on lines L18 and L17 to deenergize solenoid 50a which deenergizes low speed feed clutch 50. Then the power travels on line L17, up line L16 and over line L15 to energize solenoid 45a which actuates high speed feed clutch 45 for the second cut.

At the same time power is still being conveyed to solenoid 30a directly through line L12. Solenoid 30a keeps low speed stroking clutch 30 energized.

If it is desirable to run a cutting cycle and have a high speed stroking and a high speed feed for both the first and second cuts the following selector switches should be placed in this position. Selector switch SS7–A2 on line L14 should be closed and selector switch SS6–A2 on line L9 should be closed and selector switch SS6–A1 on line L13 should be opened and selector switch SS7–A1 on line L18 should be opened. For the first cut coil of relay CR10 becomes energized and its contactors CR10 on lines L12 and L17 open and the contactors CR10 on lines L13 and L18 close.

Power then goes straight through line L9 and line L10 to energize solenoid 23a which actuates high speed stroking clutch 23 for both cuts. Also power travels through lines L14 and L15 to energize solenoid 45a which actuates high speed feed clutch 45 for both cuts.

During the action of cam 99 at the middle of the cutting cycle nothing happens other than the closing of contactors CR10 on lines L12, and L17 and the opening of contactors CR10 on lines L13 and L18. When this occurs the power cannot be shunted to any other lines because of the positions of the various selector switches.

The machine can also be run through a two cut cycle and have a high speed stroking for both cuts and a low rotary feed for both cuts by placing the selector switches in the following position. Selector switch SS6–A1 on line L13 open and selector switch SS6–A2 on line L9 closed.

Also selector switch SS7–B2 on line L15 open and selector switch SS7–B1 on line L17 closed. When the first cut starts coil of relay CR10 becomes energized and contactors CR10 on lines L12 and L17 open and contactors CR10 on lines L13 and L18 close.

In this choice of selection the power travels from line L2 to line L1 through lines L9 and L10 to energize solenoid 23a which actuates high speed stroking clutch 23 for both cuts and also power travels through line L13 to line L17 during the first cut to energize solenoid 50a which actuates low speed feed clutch 50.

Then when the second cut starts the same previously described cam action occurs whereby coil of relay CR10 becomes deenergized because LS13 opens. As a result the contactor CR10 on line L18 opens and breaks the circuit to line L17 and solenoid 50a thereby deenergizing low speed feed clutch 50 but at this instant contactor CR10 on line L17 closes and power is shunted across line L17 to keep solenoid 50a energized which in turn keeps low speed feed clutch 50 energized for the second cut.

Also a low speed stroking can be run during both cuts along with a high speed rotary feed for both cuts by placing selector switch SS6–B2 on line L10 open and selector switch SS6–B1 on line L2 closed and also selector switch SS7–A2 on line L14 closed and selector switch SS7–A1 on line L18 open.

When coil of relay CR10 energizes the contactors CR10 on lines L12 and L17 open and contactors CR10 on lines L13 and L18 close.

Then power will travel through line L13 to line L12 to energize solenoid 30a which actuates the low speed stroking clutch 30 for the first cut and at the same time power will travel through line L14 and L15 to energize solenoid 45a which actuates high speed feed clutch 45. When the second cut begins the circuit on line L13 is broken by contactor CR10 opening but power travels straight across line L12 because contactor CR10 on line L12 closes when contactor CR10 on line L13 opens to keep solenoid 30a energized which in turn keeps low speed stroking clutch 30 energized.

And at the same time the power to solenoid 45a which keeps high speed feed clutch 45 energized is not interrupted so clutch 45 continues to be energized for the second cut.

A low speed stroking for both cuts can be run along with a low speed rotary feed for both cuts by placing selector switch SS6–B2 on line L10 open and selector switch SS6–B1 on line L12 closed and also selector switch SS7–B2 on line L15 open and selector switch SS7–B1 on line L17 closed. Coil of relay CR10 energizes and contactors CR10 on lines L12 and L17 open and contactors CR10 on lines L13 and L18 close.

During the first cut power travels across line L13 and line L12 to energize solenoid 30a which actuates low speed stroking clutch 30 and also across lines L18 and L17 to energize solenoid 50a which actuates low speed feed clutch 50. Then when the second cut starts the contactors CR10 on lines L12 and L17 close and contactors CR10 on lines L13 and L18 open.

Power then travels on line L12 straight across to keep solenoid 30a energized which in turn keeps low speed stroking clutch 30 energized, while at the same time power travels across line L17 to keep solenoid 50a energized which in turn keeps low speed feed clutch 50 energized for the second cut.

What I claim and desire to secure by Letters Patent is:

1. In a gear shaper of the character described having a base, a reciprocating cutter spindle mounted in said base, a work spindle rotatably mounted in said base adjacent to said first mentioned spindle, means to reciprocate said first mentioned spindle, means to relatively rotate said second mentioned spindle with respect to said first mentioned spindle and means operable in timed relation to the reciprocation of said reciprocating spindle and the relative rotation of said spindles to change the relative number of reciprocations of said reciprocating spindle.

2. In a gear shaper of the character described, having a base, a relatively reciprocating cutter spindle mounted in said base, a relatively rotating work spindle mounted in said base adjacent to said cutter spindle, means to impart said relative reciprocation to said first mentioned spindle, means to impart said relative rotation to said second mentioned spindle, means operable in timed relation to the said relative reciprocation of said first spindle to change the number of relative reciprocations of said first spindle and means operable in timed relation to the relative rotation of said spindles to change the rate of said relative rotation.

3. In a gear shaper of the character described, a base, a cutter spindle mounted in said base, a work spindle mounted in said base adjacent to said cutter spindle, means to reciprocate said cutter spindle relative to said work spindle, means to rotate said cutter spindle relative to said work spindle, means to rotate said work spindle relative to said cutter spindle and means responsive to a predetermined amount of given relative rotation of said spindles to change the number of relative reciprocations of said cutter spindle.

4. In a gear shaper of the character described, a base, a cutter spindle mounted in said base, a work spindle mounted in said base adjacent to said cutter spindle, means to reciprocate said cutter spindle relative to said work spindle, means to rotate said cutter spindle relative to said work spindle, means to rotate said work spindle relative to said cutter spindle and means responsive to a predetermined amount of given relative rotation of said spindles to change the number of relative reciprocations of said cutter spindle and the rate of the relative rotation of said work and cutter spindle.

5. In a machine of the character described, a base, a cutter spindle mounted in said base, a work spindle mounted in said base adjacent to said cutter spindle, means to reciprocate said cutter spindle relative to said work spindle, means to rotate said cutter spindle, means to rotate said work spindle relative to said cutter spindle, means constructed and arranged to vary the number of relative reciprocations of said cutter spindle, means constructed and arranged to vary the rate of relative rotation of said cutter and work spindles, and means responsive to a predetermined amount of relative rotation of said work and cutter spindles to actuate said last two mentioned means.

6. In a gear shaper of the character described, a work spindle, a cutter spindle, means to rotate said cutter spindle relative to said work spindle, means to reciprocate said work and cutter spindles relative to each other, means to impart a depth feed to said cutter spindle relative to said work spindle, said depth feed imparting means including a depth feed cam shaft, a depth feed cam fixed to said shaft, a second cam mounted on said shaft, and means operable from said second cam whereby the means rotating said cutter spindle relative to said work spindle is operable in timed relation to said rotation to vary the ratio of the relative rotational speeds of said cutter and work spindles.

7. In a gear shaper of the character described, a work spindle, a cutter spindle, means to rotate said cutter spindle relative to said work spindle, means to reciprocate said work and cutter spindles relative to each other, means to impart a depth feed to said cutter spindle relative to said work spindle, said depth feed imparting means including a depth feed cam shaft, a depth feed cam fixed to said shaft, a second cam mounted on said shaft, and means operable from said second cam whereby the means rotating said cutter spindle relative to said work spindle is operable in timed relation to said rotation to vary the ratio of the relative reciprocating speeds of said cutter and work spindles.

8. In a gear shaper of the character described, a work spindle, a cutter spindle, means to rotate said cutter spindle relative to said work spindle, means to reciprocate said work and cutter spindles relative to each other, means to impart a depth feed to said cutter spindle relative to said work spindle, said depth feed imparting means including a depth feed cam shaft, a depth feed cam fixed to said shaft, a second cam mounted on said shaft, and means operable from said second cam whereby the means rotating said cutter spindle relative to said work spindle is operable in timed relation to said rotation to vary the ratio of the relative rotational and relative reciprocating speeds of said cutter and work spindles.

9. In a gear shaper of the character described, a base, a cutter spindle reciprocably and rotatably mounted in said base, means to reciprocate said cutter spindle, means to rotate said cutter spindle, a work spindle, rotatably mounted adjacent to said cutter spindle in said base, means to rotate said work spindle, means to impart a depth feed movement to said cutter spindle relative to said work spindle by movement transversely of its axis, said last named means including a depth feed cam shaft rotatably mounted on said base, and a depth feed cam fixed to rotate with said shaft, a second cam fixed on said shaft and spaced from said depth feed cam, means responsive to rotation of said second cam to change the rate of reciprocation of said cutter spindle, a second means responsive to the rotation of said second cam to change the rate of rotation of said cutter spindle, and a third means responsive to rotation of said second cam to vary the rate of rotation of said work spindle.

10. In a gear shaper of the character described, a base, a cutter spindle reciprocably and rotatably mounted in said base, means to reciprocate said cutter spindle, means to rotate said cutter spindle, a work spindle rotatably mounted adjacent to said cutter spindle in said base, means to rotate said work spindle, means to impart a depth feed movement to said cutter spindle relative to said work spindle by movement transversely of its axis, said last named means including a depth feed cam shaft rotatably mounted on said base, and a depth feed cam fixed to rotate with said shaft, a second cam fixed on said shaft and spaced from said depth feed cam, means responsive to rotation of said second cam to change the rate of reciprocation of said cutter spindle, and a second means responsive to rotation of said second cam to change the rate of rotation of said cutter spindle.

References Cited in the file of this patent

UNITED STATES PATENTS

| | | |
|---|---|---|
| 1,177,503 | Fellows | Mar. 28, 1916 |
| 1,987,006 | Foster | Jan. 8, 1935 |
| 2,025,035 | Avis | Dec. 24, 1935 |
| 2,029,398 | Sykes | Feb. 4, 1936 |
| 2,063,262 | Miller | Dec. 8, 1936 |
| 2,371,702 | Miller et al. | Mar. 20, 1945 |
| 2,464,961 | Bean | Mar. 22, 1949 |
| 2,529,067 | Bennett | Nov. 7, 1950 |
| 2,641,968 | Miller | June 16, 1953 |
| 2,721,487 | Morey | Oct. 25, 1955 |
| 2,749,805 | Kendall | June 12, 1956 |
| 2,756,642 | Miller | July 31, 1956 |